US005373209A

United States Patent [19]

Strobl et al.

[11] Patent Number: 5,373,209

[45] Date of Patent: Dec. 13, 1994

[54] ASSEMBLED COMMUTATOR

[75] Inventors: Georg Strobl, Stuttgart, Germany; Ho S. Pun, Chaiwan, Hong Kong

[73] Assignee: Johnson Electric S.A., Switzerland

[21] Appl. No.: 37,222

[22] Filed: Mar. 26, 1993

[30] Foreign Application Priority Data

Apr. 25, 1992 [GB] United Kingdom .............. 9208980.4

[51] Int. Cl.[5] .............................................. H02K 13/04

[52] U.S. Cl. ...................................... 310/234; 310/236

[58] Field of Search ............... 310/231, 233, 234, 235, 310/236, 40 MM, 42, 71

[56] References Cited

U.S. PATENT DOCUMENTS

| | | | |
|---|---|---|---|
| 4,469,972 | 9/1984 | Rampignon et al. | 310/42 |
| 4,584,498 | 4/1986 | Strobl | 310/236 |
| 4,757,602 | 7/1988 | Evenson | 310/234 |
| 4,764,700 | 8/1988 | Strobl | 310/236 |
| 4,769,627 | 9/1988 | Baines | 310/71 |
| 4,855,632 | 8/1989 | Baines | 310/233 |
| 4,876,474 | 10/1989 | Wang et al. | 310/236 |
| 4,927,379 | 5/1990 | Wang et al. | 439/398 |
| 4,975,612 | 12/1990 | Strobl | 310/234 |
| 4,983,871 | 1/1991 | Strobl | 310/234 |

FOREIGN PATENT DOCUMENTS

| | | | |
|---|---|---|---|
| 0106444 | 9/1983 | European Pat. Off. | 310/234 |
| 0361860 | 4/1990 | European Pat. Off. | 310/234 |
| 4026025 | 2/1992 | Germany | 310/234 |
| 944536 | 12/1963 | United Kingdom | H02K 1/06 |
| 1232639 | 5/1971 | United Kingdom | H02K 13/00 |
| 2204453 | 11/1988 | United Kingdom | H02K 13/04 |
| 2223888 | 4/1990 | United Kingdom | H02K 13/00 |

*Primary Examiner*—Steven L. Stephan
*Assistant Examiner*—Matthew Nguyen
*Attorney, Agent, or Firm*—Ostrolenk, Faber, Gerb & Soffen

[57] ABSTRACT

An assembled commutator has a segment support portion and a housing portion. The housing portion has housing members formed with axially extending "T"-shaped recesses and transversely extending slots for receiving armature leads. Insulation displacing terminals are inserted in the "T"-shaped recesses and formed with slots which cooperate with the transversely extending slots to grip and contact the armature leads. The terminals are held in place by commutator segments which are formed separately from the terminals. Each commutator segment has a retainer with two prongs which straddle a terminal, and convergent sides which cooperate with the sides of an inner, circumferentially extending portion of a "T"-shaped recess to grip the terminal as the retainer is pressed axially into the "T"-shaped recess.

8 Claims, 2 Drawing Sheets

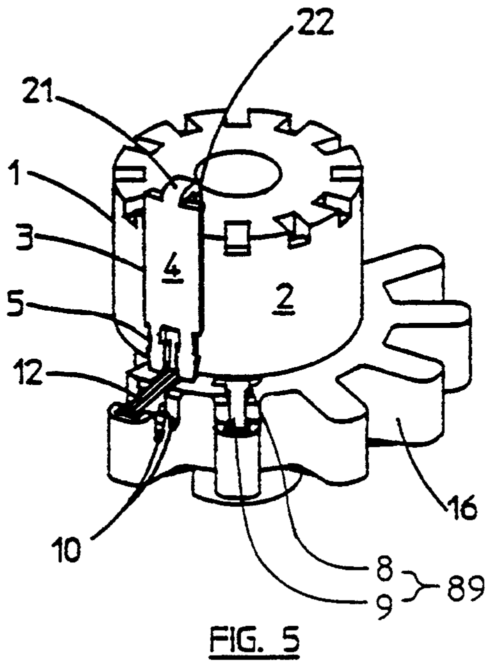
FIG. 5
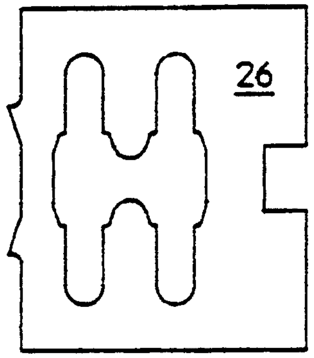
FIG. 6
FIG. 8
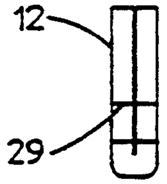
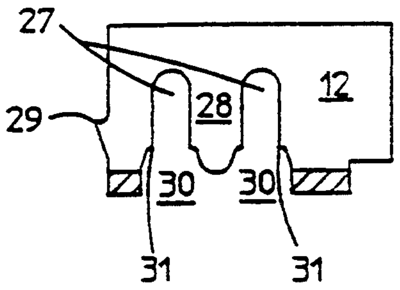
FIG. 7
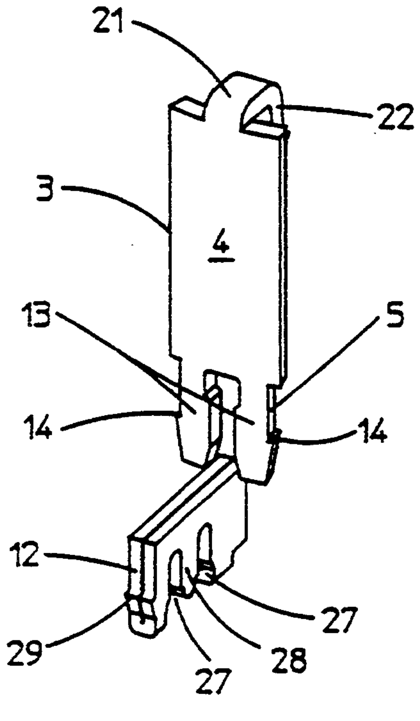
FIG. 9
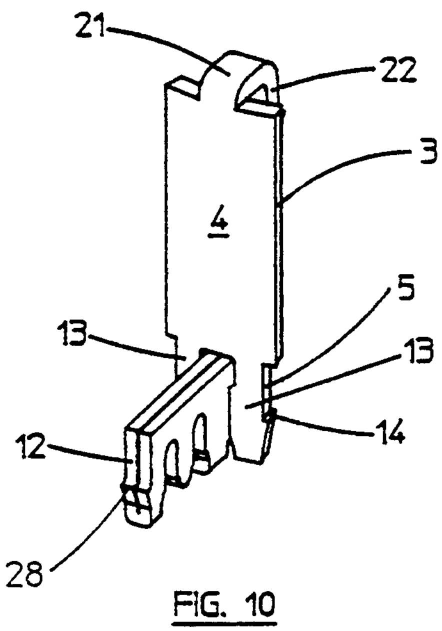
FIG. 10

ASSEMBLED COMMUTATOR

FIELD OF THE INVENTION

The invention relates to an assembled commutator in which, in contrast to a molded commutator in which the metal components are inserts in the molded insulating base the commutator, the base of the commutator and the metal components are formed separately and then assembled together.

In particular, the invention relates to an assembled commutator provided with insulation displacing terminals for connection to the armature leads which, upon engagement with the leads, slice through the insulation provided on the leads and into the surfaces of the conductive wire cores of the leads.

DESCRIPTION OF THE PRIOR ART

European Patent Specification No. 0 106 444 discloses an assembled commutator including an insulating cylindrical portion having an outer support surface; at least three commutator segments, each having an arcuate brush contact portion seated on the support surface; an insulating housing portion having at least three housings each formed with axially extending recesses and with positioning means for armature leads; and at least three slotted insulation displacing terminals disposed in the .recesses so as to cooperate with the positioning means to make electrical contact with the armature leads.

In this form of construction, the commutator segments are formed integrally with the terminals. These composite components and the commutator base comprising the insulating cylindrical portion and insulating housing portion are shaped so that each of the composite components can be positioned on the commutator base in a single translational movement in which the composite component is moved relative to the commutator base and in which cutting edges provided on the terminals of the composite components slice through insulation provided on the armature leads and into the conductive wire cores of these leads.

Although this form of construction permits automated assembly of the commutator, the necessary simultaneous alignment of different parts of the composite components with associated parts of the commutator base involves some difficulty. Moreover, because the arcuate portions of the commutator segments are required to make good electrical contact with the brushes of an electric motor and the terminals are required to cut through insulation and the outer surfaces of armature lead wires, it is not always easy to provide a composite component of material having optimal properties for both of these purposes.

Additionally, a similar size and type rotor using a different size wire for the armature winding requires a different housing and a different set of segments in order to vary the size of the insulation displacing slots to accommodate the different size wire.

BRIEF SUMMARY OF THE INVENTION

It is the purpose of the present invention to provide am assembled commutator in which these difficulties encountered with known assembled commutators are overcome.

This is achieved by providing an assembled commutator in which each commutator segment has a retainer extending axially from one end of the brush contact portion into a respective one of the recesses and physically contacting the terminal disposed therein to provide electrical connections between the armature leads and respective commutator segments.

Thus, according to the invention, there is provided an assembled commutator including a segment contact portion having an outer support surface; at least three commutator segments each having a brush contact portion seated on the outer support surface and a retainer extending axially from one end of the brush contact portion; a housing portion having at least three housing members each formed with axially extending recesses for accommodating the retainers, and with positioning members for armature leads; and at least three, separate, slotted, insulation displacing terminals respectively connected to the retainers, respectively disposed in the recesses and cooperating with the positioning members to electrically connect the armature leads to respective commutator segments.

With this form of construction, the terminals may be inserted in the recesses in one operation and the retainers of the commutator segments may be inserted in the recesses in a subsequent operation. This not only simplifies assembly, it permits more care to be taken to ensure proper insulation displacement during insertion of the terminals into the recesses.

In a preferred embodiment, the commutator segments and the terminals are made of different materials. Thus, for example, the commutator segments may be made of copper for good conductivity, whereas the terminals may be made from brass, which is harder than copper, to provide good cutting edges for insulation displacement and cutting engagement with the outer surfaces of the wire cores of the armature leads.

The retainers, recesses and terminals may be shaped so that upon axial insertion of the retainers into respective recesses, the retainers are pressed transversely into engagement with respective terminals.

According to one form of construction, the terminals include laminated elements disposed in angularly-spaced radial planes, the retainers include forked members with prongs which straddle respective terminals. Each retainer tapers so that, on axial insertion of the retainers into respective recesses, the prongs of each retainer are pressed together to clamp the terminal which is stradded by the retainer.

Alternatively, or in addition, the part of each recess which receives the retainer may also be tapered to provide the clamping effect. However, constructions such as this can be difficult to mold and so it is preferred to provide the "clamping" tapers solely on the retainers.

In this case, each prong is preferably formed with a barb which engages the recess in which the prong is disposed and each prong tapers from the barb.

To facilitate manufacture, each terminal is preferably formed from a single piece of stamped and folded sheet material, because it is easier to stamp the thinner sheet metal, even though the shear cut is twice as long. This is of particular importance when cutting slots for engagement with small diameter wires because the thickness of the sheet metal preferably should be less than the width of the slots being stamped in the sheet metal.

Although the segment support portion and the housing portion may include integral parts of a commutator base, difficulty is encountered in molding this relatively bulky and complicated component and so it is preferred that the segment support portion and the housing portion are formed as separate elements which are subsequently interconnected.

With this form of construction, it is therefore possible to fit the housing portion of the commutator to the armature of an electric motor and to make electrical connections between the armature leads and the terminals before fitting the segment support portion, thus allowing more room for the insertion of the terminals into the recesses in the housing portion and thereby simplifying this operation.

Another advantage of this construction of the invention is that the segments and the segment support portion can be made standard for a commutator having a particular number of segments with the housing portion (if need be) and the terminals being changed to accommodate armature windings of different size wire. At the same time, the terminals can be standardized for the same size armature winding wire regardless of the actual number of poles of the armature.

It should be noted that the terminals may be fitted to the housings before or after the armature has been wound depending on the orientation of the terminals. However, post wind fitting is preferred as this gives greater reliability and mechanical protection to the connection between the terminal and the armature lead.

An embodiment of the invention is hereinafter described, by way of example only, with reference to the accompanying drawings. While the invention is described in relation to a cylindrical commutator, it should be realized that the invention is equally applicable to face plate or planar commutators.

BRIEF DESCRIPTION OF THE DRAWINGS

FIG. 5 is a schematic isometric view similar to FIG. 4 but showing a terminal fitted and a commutator segment positioned for assembly with the cylindrical and housing portions;

FIG. 6 is a blank, stamped from a sheet of brass, for use in forming a terminal as shown in FIG. 5;

FIGS. 7 and 8 are side and end elevations of a terminal formed from the blank shown in FIG. 6; and FIGS. 9 and 10 are schematic isometric views of a commutator segment and a terminal before and after assembly of the commutator segment wherein the terminal with the cylindrical and housing portions are not shown for clarity.

DETAILED DESCRIPTION OF THE PREFERRED EMBODIMENT

Figure 1:
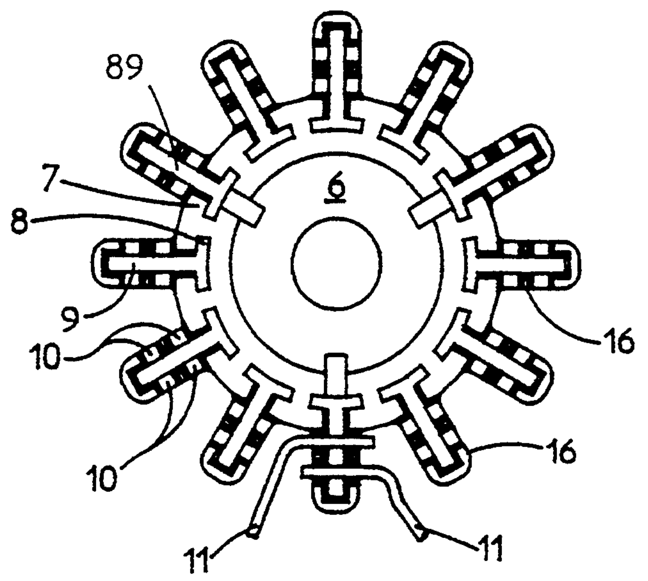
FIGS. 1 and 2 are an axial end elevation and a sectional side elevation of a housing portion of an assembled cylindrical commutator according to the invention.
Figure 2:
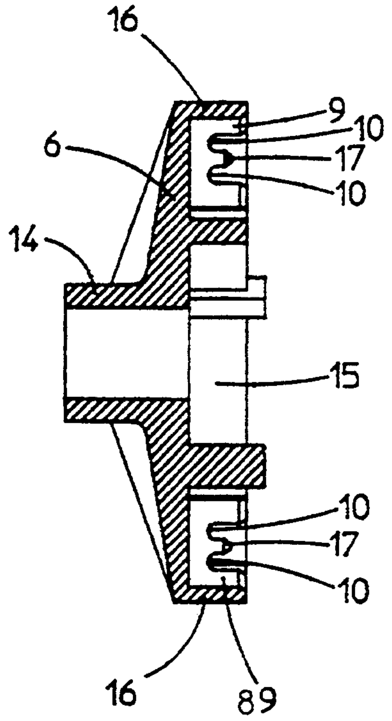

As shown in FIGS. 1 and 2, a circular housing portion 6 comprises a hub 14 supporting an annular ring 15 with twelve radial projections 16 which, together with the annular ring 15, form twelve housings 7 which each enclose a "T"-shaped recess 89 having an inner, circumferentially extending portion 8 and an outer radially extending portion 9.

The radial projection 16 of each housing 7 is formed with two transversely extending slots 10, separated by a divider 17, which serve as a positioning member for positioning armature leads 11 (only two of which are shown in FIG. 1) relative to the housing 7.

In assembling an electric motor, a housing portion 6 (only partly shown in FIGS. 3 to 5) is mounted on the shaft of the motor, adjacent the armature, and secured in place by glue or some other fastening device. A cylindrical segment support portion 1 is then connected to the housing portion 6 by an axially extending connector 18 which is received by the annular ring 15, as shown in FIGS. 3 and 4.

The housing portion 6 is also formed with three equiangularly-spaced projections 19 extending both radially and axially into complementary recesses 20 formed in the cylindrical portion 1 to lock the cylindrical portion 1 and housing portion 6 together.

Each commutator segment 3 is stamped from a copper sheet, typically 0.8 mm thick, and, as shown in FIGS. 5, 9 and 10, has an arcuate portion 4 seated on the outer support surface 2 of the cylindrical portion 1, a retainer 5 at one end of the arcuate portion 4, and a hook having a radially inwardly extending portion 21 and an axially extending portion 22 at the other end. These hook portions 21, 22 are received within twelve circumferentially-spaced radially-extending notches 23 formed in the outer end 24 of the cylindrical portion 1 and within axially extending recesses 25 which communicate with the radially inner ends of the notches 23.

Figure 3:
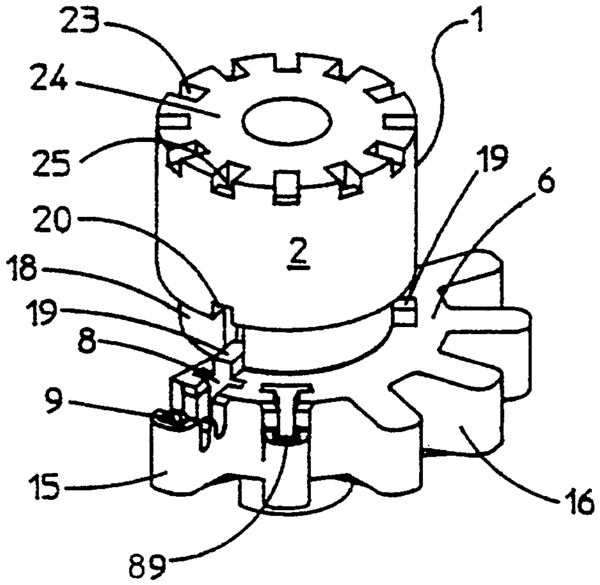
FIGS. 3 and 4 are schematic isometric views of a cylindrical segment support portion of an assembled commutator in relation to a housing portion, as shown in FIGS. 1 and 2, at two different stages in the assembly of the commutator with the housing portion partially shown for clarity.
Figure 4:
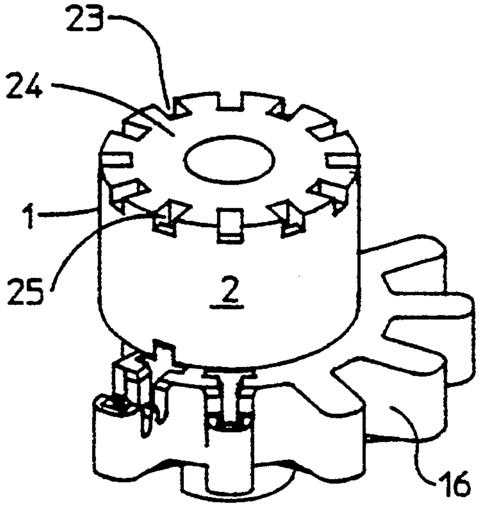

After the cylindrical portion 1 has been fitted to the housing portion 6, as shown in FIGS. 3 and 4, terminals 12 are inserted in the outer, radially-extending portions 9 of the recesses 89 and extend across the inner circumferentially-extending portions 8. Commutator segments 3 are then positioned on the outer support surface 2 of the cylindrical portion 1 and moved axially into their assembled positions as schematically illustrated in FIGS. 9 and 10.

As shown in FIG. 6, each terminal blank 26 is stamped from a thin sheet of brass, typically 0.5 mm thick, and folded as shown in FIGS. 7 and 8 to form a two-layer terminal 12 having two slots 27, separated by a divider 28, and a barb 29 at its radially outer end for retaining engagement with the radially outer end of the recess 89 in which the terminal 12 is inserted. Each slot 27, typically 0.85 mm wide, for accommodating a 1 mm diameter armature lead 11, has a convergent mouth 30 and two sharp edges 31.

During winding of the armature, armature leads 11 are placed across the face of the housings 7 and held in position by the transversely extending slots 10. The slots 10 and divider 17 of each housing 7 support at least one armature lead 11 while the terminal 12 is being inserted. During this operation, the sharp edges 31 slice through insulation on each lead 11 and into the outer layer of the wire core of the lead 11. The slots 27 and divider 28 in the terminal 12 then cooperate with the slots 10 and divider 17 to grip each of the leads 11 supported by the slots 10 and divider 17.

As shown in FIGS. 9 and 10, each retainer 5 is a forked member having two prongs 13 which straddle a terminal 12 inserted in a recess 89 and are received in the inner circumferentially-extending portion 8 of the recess 89. As shown, the outer edges of the prongs 13 are formed with barbs 14 and converge to provide a tapered retainer 5. Thus, when the prongs 13 are inserted into the inner recess portion 8, on opposite sides of the terminal 12, the tapering end of the retainer 5 cooperates with the substantially parallel side walls of the inner recess portion 8 to press the prongs 13 towards each other, to clamp the radially inner end of the terminal 12. At the same time, the barbs 14 bite into these side walls to resist axial removal of the commutator segment 3. The terminal 12 is therefore securely held in place by the barb 29, at its radially outer end, and by the barbs 14 on the prongs 13, at the other end.

A similar barb, not shown, can also be provided on the free end of each axially extending hook portion 22, for locking engagement with the internal surface of an axially extending recess 25.

We claim:

1. An assembled commutator, comprising:

a) a segment support portion having an outer support surface;

b) at least three commutator segments each including:
   1) a brush contact portion seated on the support surface; and
   2) a retainer portion extending axially from one end of the brush contact portion;

c) a housing portion having at least three housing members, each of the at least three housing members including:
   1) an axially extending recess for accommodating a retainer portion of one of the at least three commutator segments; and
   2) a positioning member for positioning armature leads; and d) at least three slotted insulation displacing terminals, each of the at least three slotted insulation displacing terminals being:
   1) disposed in contact with the retainer portion of one of the at least three commutator segments;
   2) formed separately from each of the at least three commutator segments;
   3) disposed in the recess of one of the at least three housing members; and
   4) formed to cooperate with the positioning member to electrically connect the armature leads to one of the at least three commutator segments.

2. A commutator, according to claim 1, wherein the commutator segments and the terminals are formed of different materials.

3. A commutator, according to claim 1, wherein each of the retainer portions, recesses and terminals are shaped so that on axial insertion of each of the retainer portions into a respective recess, each of the retainer portions is pressed transversely into engagement with a respective terminal.

4. A commutator, according to claim 3, wherein the terminals comprise laminated elements respectively disposed in angularly-spaced radial planes;

each of the retainer portions comprise a forked member having prongs which straddle one of the at least three terminals; and each retainer portion tapers so that, on axial insertion of each retainer portion into a respective recess, the prongs of each retainer portion are pressed together to clamp the one of the at least three terminals straddled by the retainer portion.

5. A commutator, according to claim 4, wherein each prong is formed with a barb which engages the recess in which the prong is disposed and each prong tapers from said barb.

6. A commutator, according to claim 1, wherein each terminal is formed from a single piece of stamped and folded sheet metal.

7. A commutator, according to claim 1, wherein the segment support portion and the housing portion are separately interconnected elements.

8. An assembled commutator, comprising:

a) a two part commutator base including:
   1) a cylindrical portion; and
   2) a housing portion having at least three equally circumferentially spaced housing members, each housing member including a radial projection having a "T"-shaped recess formed by a circumferentially extending recess portion and a radially extending recess portion, and having an armature lead positioning member including two transversely extending slots separated by a divider;

b) at least three laminated slotted insulation displacing terminals, each of the terminals being:
   1) disposed in one of the "T"-shaped recesses along the radially extending recess portion and extending into the circumferentially extending recess portion; and
   2) formed with two slots in alignment with the two transversely extending slots of each of the housing members and arranged to displace insulation on armature leads located in the transversely extending slots of each .of the housing members to make electrical contact with conductive wire cores of the leads as the leads are drawn into the terminal slots by insertion of the terminal into one of the housing members; and c) at least three commutator segments supported by the cylindrical portion, each of the at least three commutator segments including:
   1) a brush contact portion seated on the cylindrical portion;
   2) a hook extending from one end of the brush contact portion received in a respective notch formed in the cylindrical portion to anchor said one end to the cylindrical portion; and
   3) a retainer extending axially from an opposite end of the brush contact portion, the retainer having two prongs which straddle one of the at least three laminated slotted insulation displacing terminals, each of the two prongs having a barb and a body tapering away from the barb, the two prongs cooperating with one of the circumferentially extending recess portions of one of the housing members to grip the one of the at least three terminals straddled by the prongs as the retainers are inserted into the circumferentially extending recess portions to establish electrical contact between the armature leads and respective commutator segments, each of the barbs engaging an inner wall surface of each of the "T"-shaped recesses to prevent removal of the retainers.

* * * * *